United States Patent
Tan et al.

(10) Patent No.: US 9,826,171 B2
(45) Date of Patent: Nov. 21, 2017

(54) APPARATUS AND METHOD FOR RECONSTRUCTING HIGH DYNAMIC RANGE VIDEO

(71) Applicant: NOVATEK Microelectronics Corp., Hsin-Chu (TW)

(72) Inventors: Xianbo Tan, Xi'an (CN); Jianhua Liang, Xi'an (CN); Yuanjia Du, Jinan (CN)

(73) Assignee: NOVATEK Microelectronics Corp., Hsin-Chu (TW)

( * ) Notice: Subject to any disclaimer, the term of this patent is extended or adjusted under 35 U.S.C. 154(b) by 44 days.

(21) Appl. No.: 14/967,341

(22) Filed: Dec. 13, 2015

(65) Prior Publication Data

US 2017/0126987 A1    May 4, 2017

Related U.S. Application Data

(60) Provisional application No. 62/248,292, filed on Oct. 29, 2015.

(51) Int. Cl.
*H04N 5/265* (2006.01)
*H04N 5/235* (2006.01)
*G06T 5/00* (2006.01)
*G06T 5/50* (2006.01)
*H04N 5/77* (2006.01)

(52) U.S. Cl.
CPC ............. *H04N 5/265* (2013.01); *G06T 5/009* (2013.01); *G06T 5/50* (2013.01); *H04N 5/2351* (2013.01); *H04N 5/2355* (2013.01); *H04N 5/77* (2013.01); *G06T 2207/10016* (2013.01); *G06T 2207/10144* (2013.01)

(58) Field of Classification Search
CPC .... H04N 5/265; H04N 5/2351; H04N 5/2355; H04N 5/772; G06T 7/0024
See application file for complete search history.

(56) References Cited

U.S. PATENT DOCUMENTS 8,792,019 B2 * 7/2014 Yuyama ............... H04N 5/2355 348/218.1

* cited by examiner

*Primary Examiner* — Twyler Haskins
*Assistant Examiner* — Fayez Bhuiyan
(74) *Attorney, Agent, or Firm* — Winston Hsu

(57) ABSTRACT

A method is provided for reconstructing a high dynamic range (HDR) video from a low dynamic range (LDR) video. The LDR video is captured with dynamic exposure values by a regular camera device to store as an LDR video file. An exposure setting sequence and an LDR video frame sequence are retrieved from the LDR video file, where the exposure setting sequence corresponds to the LDR video frame sequence. The LDR video frame sequence is aligned to generate a compensated frame sequence to merge with the LDR video frame sequence, so as to generate an HDR frame sequence and reconstruct the HDR video.

12 Claims, 8 Drawing Sheets

APPARATUS AND METHOD FOR RECONSTRUCTING HIGH DYNAMIC RANGE VIDEO

CROSS REFERENCE TO RELATED APPLICATIONS

This application claims the benefit of U.S. Provisional Application No. 62/248,292 filed on Oct. 29, 2015 and entitled "APPARATUS AND METHOD FOR HDR VIDEO SYSTEM", the contents of which are incorporated herein.

BACKGROUND OF THE INVENTION

1. Field of the Invention

The present invention relates to an apparatus and method for constructing high dynamic range video, and more particularly, to an apparatus and method for reconstructing high dynamic range video from low dynamic range video.

2. Description of the Prior Art

High Dynamic Range (HDR) image reconstruction has obtained a lot of attention in recent years, which is mostly applied in still images. For video applications, it is difficult to capture high quality HDR videos with a conventional or regular or consumer-level camera, so specialized cameras are designed for directly capturing HDR video, but they are expensive and not prevalent.

There are few solutions for HDR video reconstruction, where the camera and scene are not still and all captured frames are dynamic when the conventional or regular cameras are used. In such a situation, there are two challenges of HDR video reconstruction, one is merging the frames with different exposure values, and the other is alignment of the frames with global and local motions.

Therefore, it has become a goal in the industry to overcome the challenges of HDR video reconstruction.

SUMMARY OF THE INVENTION

It is therefore an objective of the present invention to provide an apparatus and method for constructing high dynamic range video from low dynamic range video.

The present invention discloses a method of reconstructing a high dynamic range (HDR) video from a low dynamic range (LDR) video. The method includes outputting an exposure setting to a camera device to receive an LDR video from the camera device, storing the LDR video as an LDR video file, retrieving an exposure setting sequence and an LDR video frame sequence from the LDR video file, where the exposure setting sequence corresponds to the LDR video frame sequence, performing alignment to the LDR video frame sequence to generate a compensated frame sequence, and merging the LDR video frame sequence with the compensated frame sequence to generate an HDR frame sequence and the HDR video.

The present invention further discloses an apparatus for reconstructing an HDR video from an LDR video. The apparatus includes a camera device, a memory device, and a processing device. The camera device captures an LDR video with dynamic exposure values according to an exposure setting. The memory device stores the LDR video as an LDR video file and a program code. The processing device is coupled to the camera device and the memory device for performing a process of HDR video reconstruction according to an instruction from the program code to generate an HDR video. The process includes outputting the exposure setting to the camera device to receive the LDR video from the camera device, retrieving an exposure setting sequence and an LDR video frame sequence from the LDR video file, where the exposure setting sequence corresponds to the LDR video frame sequence, performing alignment to the LDR video frame sequence to generate a compensated frame sequence, and merging the LDR video frame sequence with the compensated frame sequence to generate an HDR frame sequence and the HDR video.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
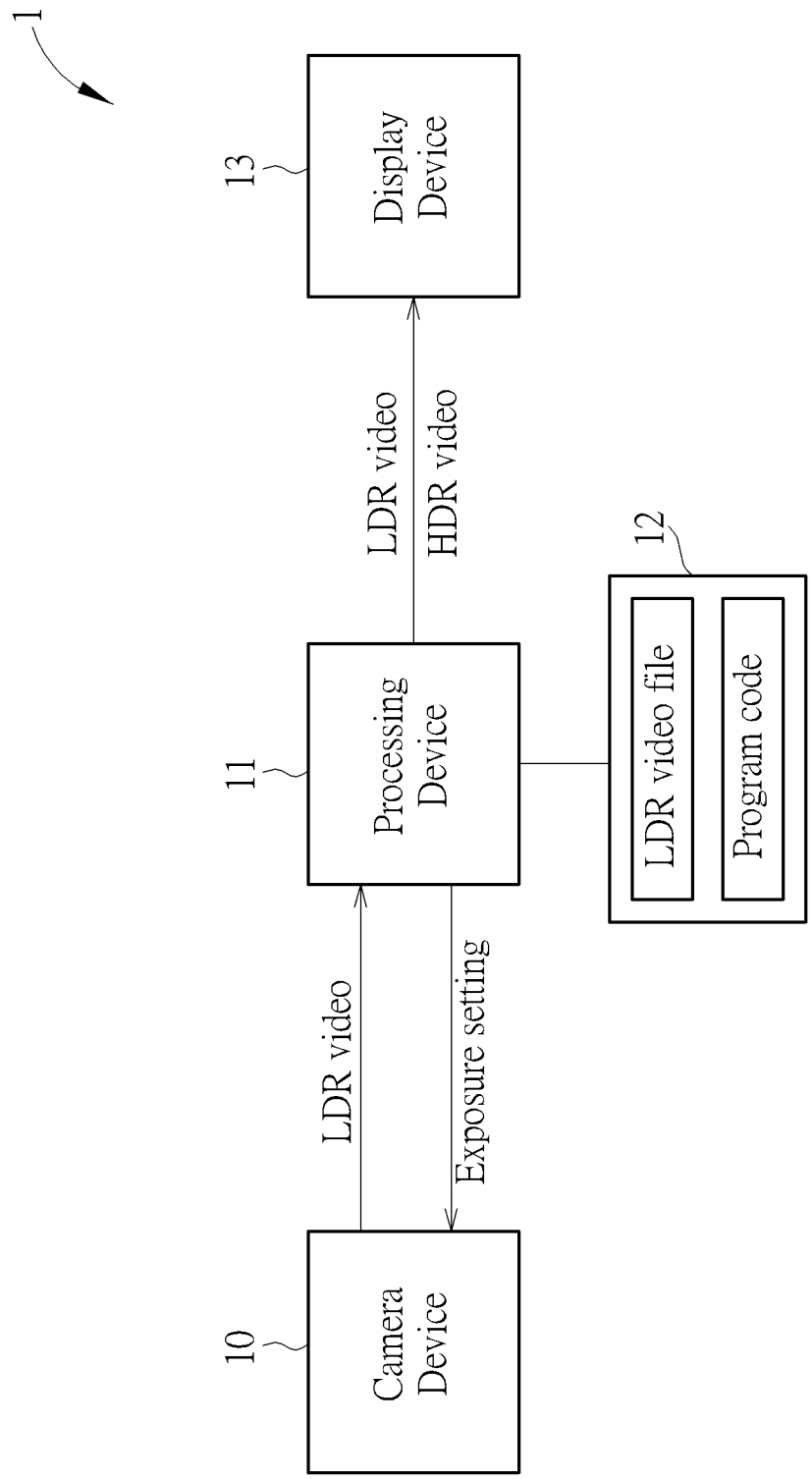
FIG. 1A shows a schematic diagram of a high dynamic range (HDR) video reconstruction system according to an embodiment of the present invention.

FIG. 1A shows a schematic diagram of a high dynamic range (HDR) video reconstruction system 1 according to an embodiment of the present invention. The HDR video reconstruction system 1 may be utilized in an electronic device such as smart phone, tablet computer, or laptop computer, for reconstructing the HDR video from a low dynamic range (LDR) video. The HDR video reconstruction system 1 includes a camera device 10, a processing device 11, a memory device 12, and a display device 13.

The camera device 10 is coupled to the processing device 11 for generating an LDR video with dynamic exposure values according to an exposure setting generated by the processing device 11. The camera device 10 may be normal consumer level, like camera on a mobile device, or image capturing devices such as charge-coupled device (CCD), or complementary metal-dioxide semiconductor (CMOS) image sensor.

The processing device 11 is coupled to the camera device 10, the memory device 12 and the display device 13, for outputting the exposure setting to the camera device 10 to receive the LDR video from the camera device 10, and processing the LDR video to store it as an LDR video file in the memory device 12. The processing device 11 performs HDR video reconstruction according to the instruction from a program code to generate an HDR video. In one embodiment, the processing device 11 further generates an LDR video according to the HDR video or the LDR video file.

The memory device 12 is coupled to the processing device 11 for storing the LDR video file and the program code (or software application) for instructing the processing device 11 to perform HDR video reconstruction. The display device 13 is coupled to the processing device 11 for displaying the HDR video or the LDR video to the user, e.g., a television (TV) set or a screen of a mobile device.

Figure 1B:
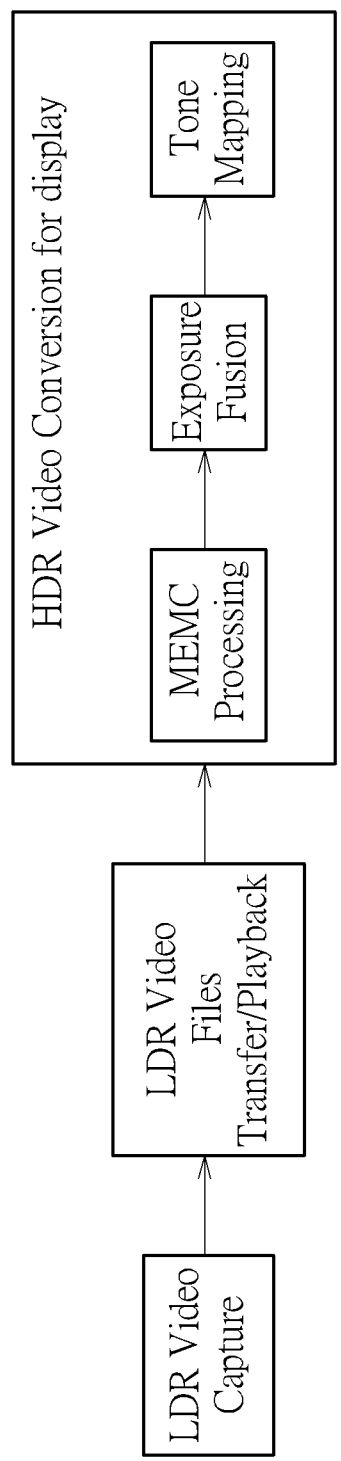
FIG. 1B shows a functional block diagram of the HDR video reconstruction system according to an embodiment of the present invention.

FIG. 1B shows a functional block diagram of the HDR video reconstruction system 1 according to an embodiment of the present invention. Operations of the HDR video reconstruction system 1 can be summarized in three stages: LDR video capture in regular cameras, the LDR video content transfer and playback, and HDR video conversion for display. The stage of HDR video conversion for display includes motion estimate and motion compensation (MEMC) processing, exposure fusion, and tone mapping. Normally, the LDR video is transferred from the camera device 10 to be processed and played on another device, e.g. the TV set. So, the second and thirds stages can be operated by either the processing device 11 or the display device 13, or both of them.

Figure 2:
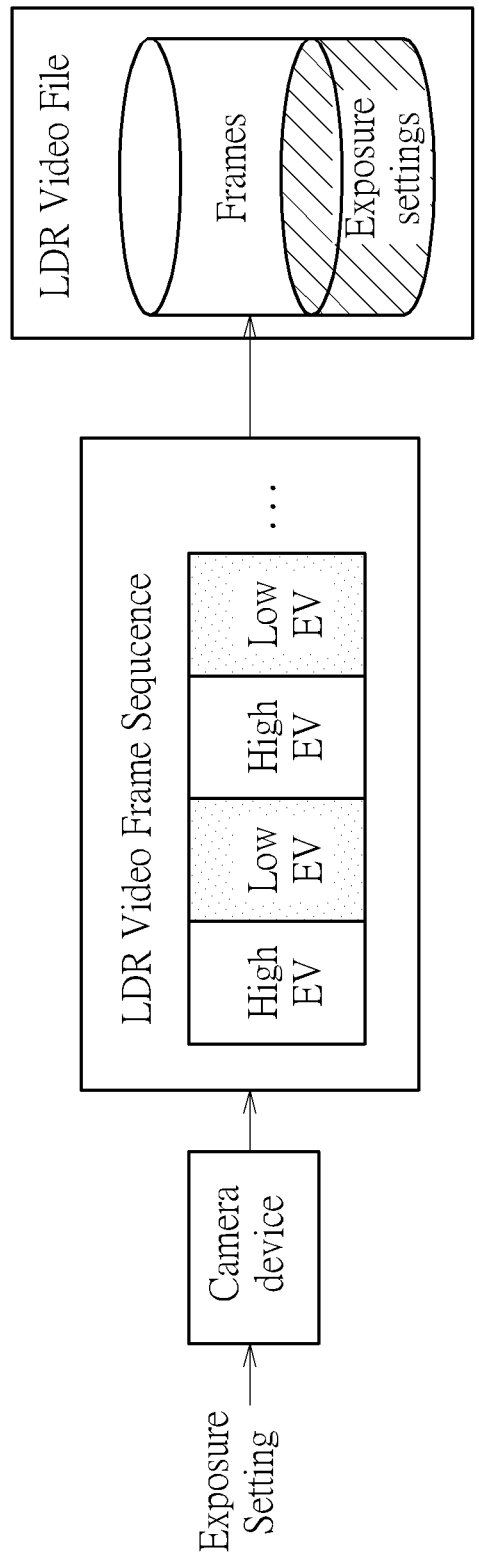
FIG. 2 shows operations of a low dynamic range (LDR) video capture according to an embodiment of the present invention.

FIG. 2 shows operations of the LDR video capture according to an embodiment of the present invention. The processing device 11 generates the exposure setting to the camera device 10, which instructs the camera device 10 to capture the LDR video frame by frame with dynamic exposure values and required frame-rate (e.g., 60 Hz). Specifically, the camera device 10 captures one frame with a high exposure value (denoted with blank) and the following frame with a low exposure value (denoted with dotted patterns), and repeats the above mentioned capturing until the camera device 10 stops operating (for example, due to a user's control). The LDR video frame sequence is captured in a fashion that the exposure value of each LDR frame is changing online. So, the LDR video frame sequence is exposed sequentially, where a format of the LDR video frame sequence is kept the same as a traditional format. Therefore, the processing device 11 is able to process the LDR video frame sequence generated by most of regular cameras.

After finishing capturing, the processing device 11 stores the LDR video and corresponding exposure setting as the LDR video file (e.g., 30 Hz) in the memory device 12. In this manner, the frame rate 60 Hz is lowered to 30 Hz in order to obtain a high dynamic range.

Figure 3:
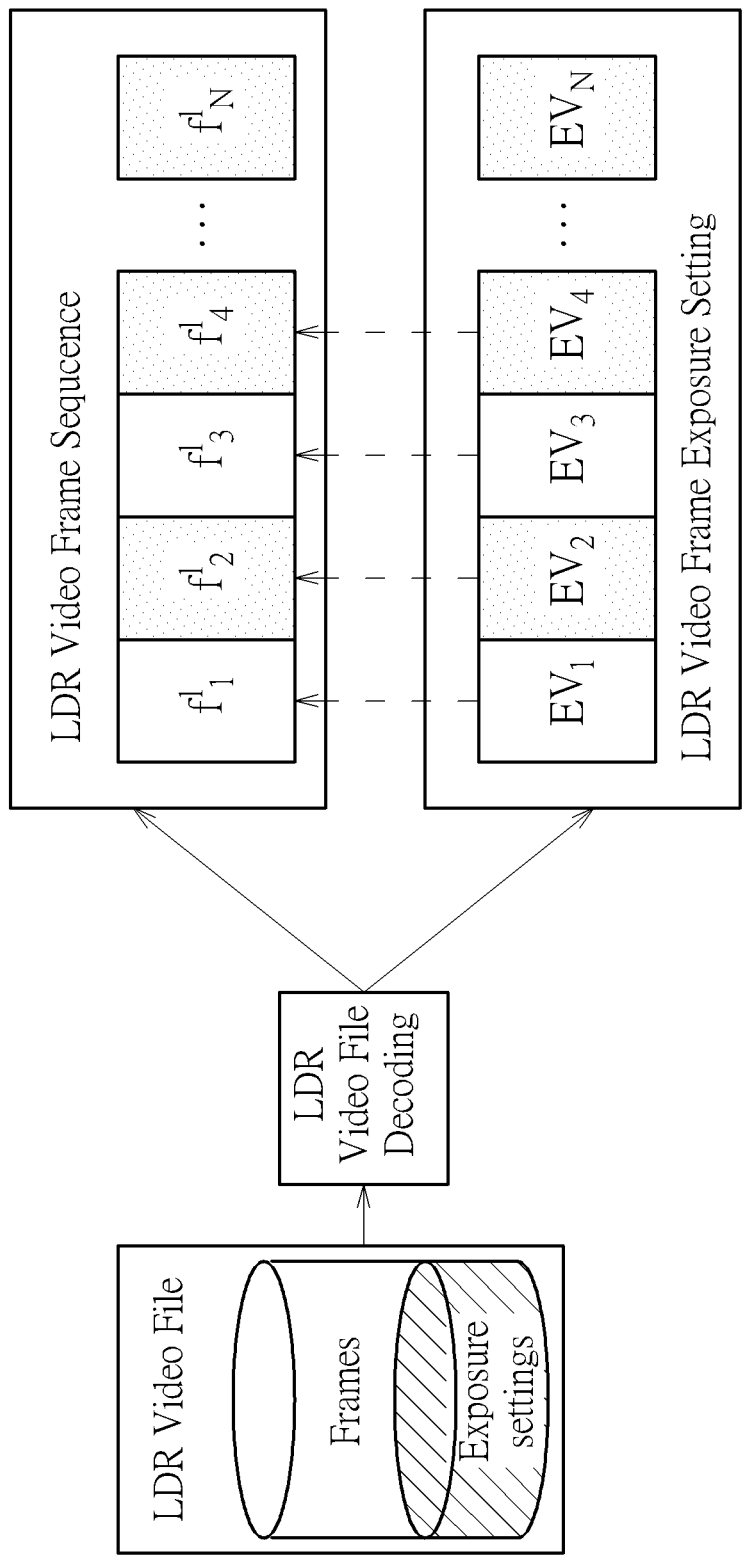
FIG. 3 shows operations of the LDR video file transfer and playback according to an embodiment of the present invention.

FIG. 3 shows operations of the LDR video file transfer and playback according to an embodiment of the present invention. The processing device 11 performs decoding to retrieve an exposure setting sequence $EV_1$-$EV_N$ (i.e., transfer) and an LDR video frame sequence $f^l_1$-$f^l_N$ (i.e., playback) from the LDR video file, where the exposure setting sequence $EV_1$-$EV_N$ corresponds to the LDR video frame sequence $f^l_1$-$f^l_N$. The exposure setting sequence $EV_1$-$EV_N$ is used in pre-processing of MEMO. In the MEMO pre-processing, the LDR video frame sequence $f^l_1$-$f^l_N$ is processed according to the exposure setting sequence $EV_1$-$EV_N$ and a camera curve of the camera device 10, e.g., real world brightness values mapping to pixel values 0-255. With the separated exposure setting sequence $EV_1$-$EV_N$ and the LDR video frame sequence $f^l_1$-$f^l_N$, the processing device 11 is ready to perform MEMO processing.

Figure 4:
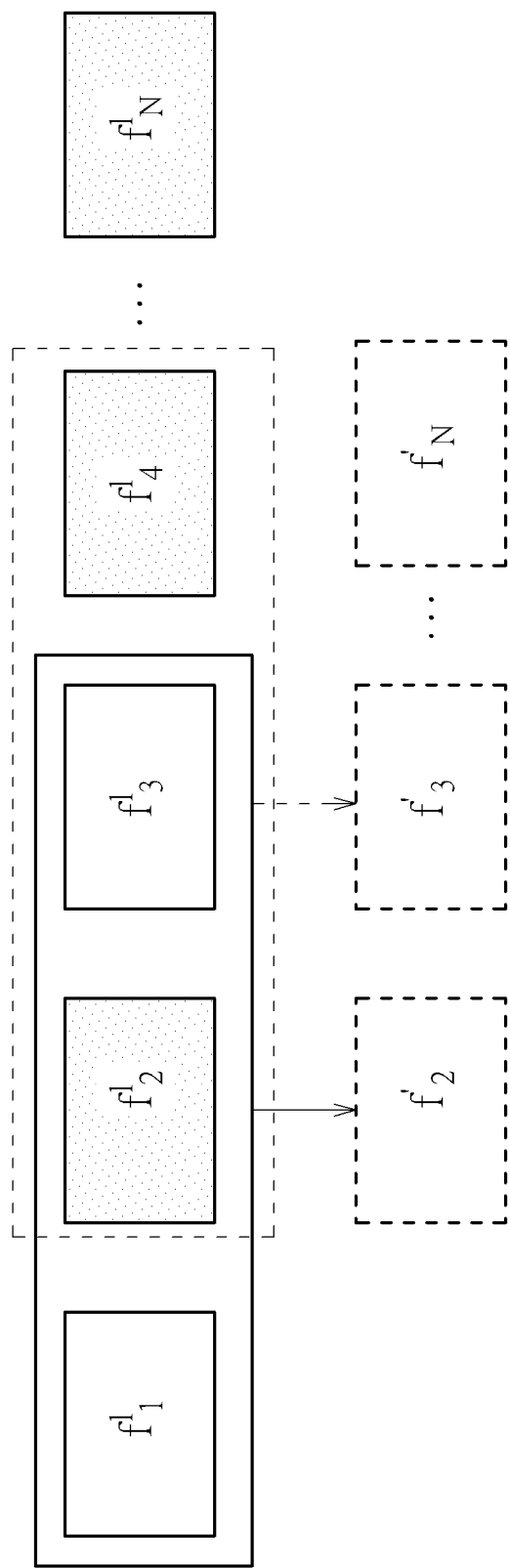
FIG. 4 shows operations of a motion estimate and motion compensation processing according to an embodiment of the present invention.

FIG. 4 shows operations of the MEMO processing according to an embodiment of the present invention. Assume that the LDR video is captured with two exposure values, where one is higher than the other. For example, the LDR video frames $f^l_1$, $f^l_3$ ... and $f^l_{N-1}$ (assume N is even) are captured with low exposure values $EV_1$, $EV_3$ ... and $EV_{N-1}$, and the LDR video frames $f^l_2$, $f^l_4$ ... and $f^l_N$ are captured with high exposure values $EV_2$, $EV_4$ ... and $EV_N$. In one embodiment, the LDR video is captured with dynamic exposure values, the frames $f^l_1$, $f^l_2$ and $f^l_3$ may be respectively captured with the dynamic exposure values $EV_1$, $EV_2$ and $EV_3$, and the middle exposure value $EV_2$ is lower or higher than both the exposure values $EV_1$ and $EV_3$.

The processing device 11 performs alignment to the LDR video frame sequence $f^l_1$-$f^l_N$ to generate a compensated frame sequence $f^l_1$-$f^l_N$. The LDR video frame sequence $f^l_1$-$f^l_N$ may contain moving objects, performing the alignment to the LDR video frame sequence $f^l_1$-$f^l_N$ is essential before performing the exposure fusion, which prevents the HDR video from containing ghost of the moving objects after the exposure fusion. Performing the alignment requires three continuous frames (e.g., two frames with low exposure values and one frame with high exposure value, or two frames with high exposure values and one frame with low exposure value).

For example, three continuous frames $f^l_1$, $f^l_2$ and $f^l_3$ of the LDR video frame sequence $f^l_1$-$f^l_N$ are aligned to generate the compensated frame $f'_2$, and the compensated frame corresponds to the middle frame $f^l_2$ of the three continuous frames $f^l_1$, $f^l_2$ and $f^l_3$. In detail, the frames $f^l_1$ and $f^l_3$ with the low exposure values $EV_1$ and $EV_3$ are aligned to generate a frame with a high exposure value $EV_{1\_3}$ to be aligned with the frame $f^l_2$ with the high exposure value $EV_2$, so the compensated frame $f'_2$ is generated. Likewise, the processing device 11 performs alignment among three continuous frames $f^l_2$, $f^l_3$ and $f^l_4$ to generate the compensated frame $f'_3$ corresponding to the middle LDR video frame $f^l_3$. For other frames, the same operation is executed to generate the compensated frame sequence $f'_1$-$f'_N$. In one embodiment, the MEMO processing further takes charge of frame-rate up conversion for the LDR video frame sequence $f^l_1$-$f^l_N$ from 30 Hz to 60 Hz.

Figure 5:
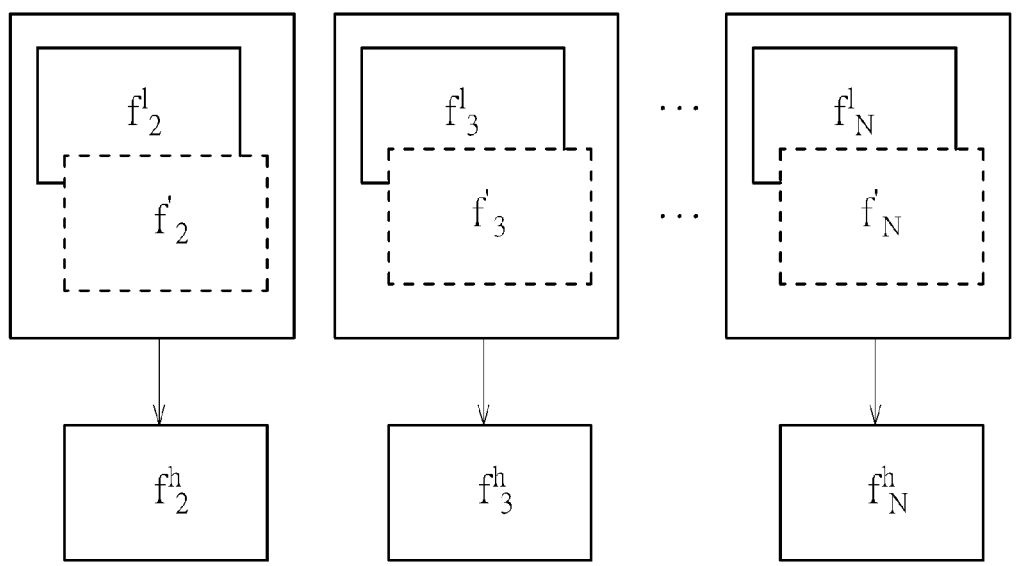
FIG. 5 shows operations of an exposure fusion according to an embodiment of the present invention.

FIG. 5 shows operations of the exposure fusion according to an embodiment of the present invention. Based on FIG. 4, the LDR video frame $f^l_2$ is merged with the compensated frame $f'_2$ to generate an HDR frame $f^h_2$. Likewise, the LDR video frame $f^l_3$ is merged with the compensated frame $f'_3$ to generate an HDR frame $f^h_3$. For other frames, the same operation is executed to generate an HDR frame sequence $f^h_1$-$f^h_N$. As a result, the HDR video is reconstructed to be displayed by the display device 13.

Figure 6:
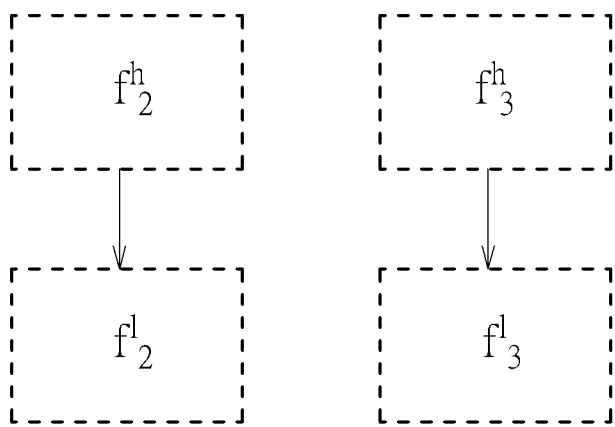
FIG. 6 shows operations of a tone mapping according to an embodiment of the present invention.

FIG. 6 shows operations of the tone mapping according to an embodiment of the present invention. The tone mapping unit 144 maps the HDR frame sequence $f^h_1$-$f^h_N$ to LDR frames according to display configurations of the display device 13, which enables displaying on an LDR display device. The tone mapping is an optional operation in the video reconstruction system 1.

In short, the present invention utilizes the regular camera device to capture the LDR video with dynamic exposure values to lower the frame-rate in order to obtain the high dynamic range, and the exposure setting sequence and the corresponding LDR video frame sequence are retrieved from the LDR video file for the frame alignment and frame merging operations. In this manner, the HDR video reconstruction system of the present invention is able to reconstruct the HDR video from the LDR video. The HDR video reconstruction system is easy for implementation and compatible with most regular cameras, and only requires a software application based on HDR video reconstruction system, so the cost is much lower than the specialized cameras for directly capturing HDR video.

Those skilled in the art may make modifications or alterations accordingly, which is not limited to the above mentioned embodiments.

Figure 7:
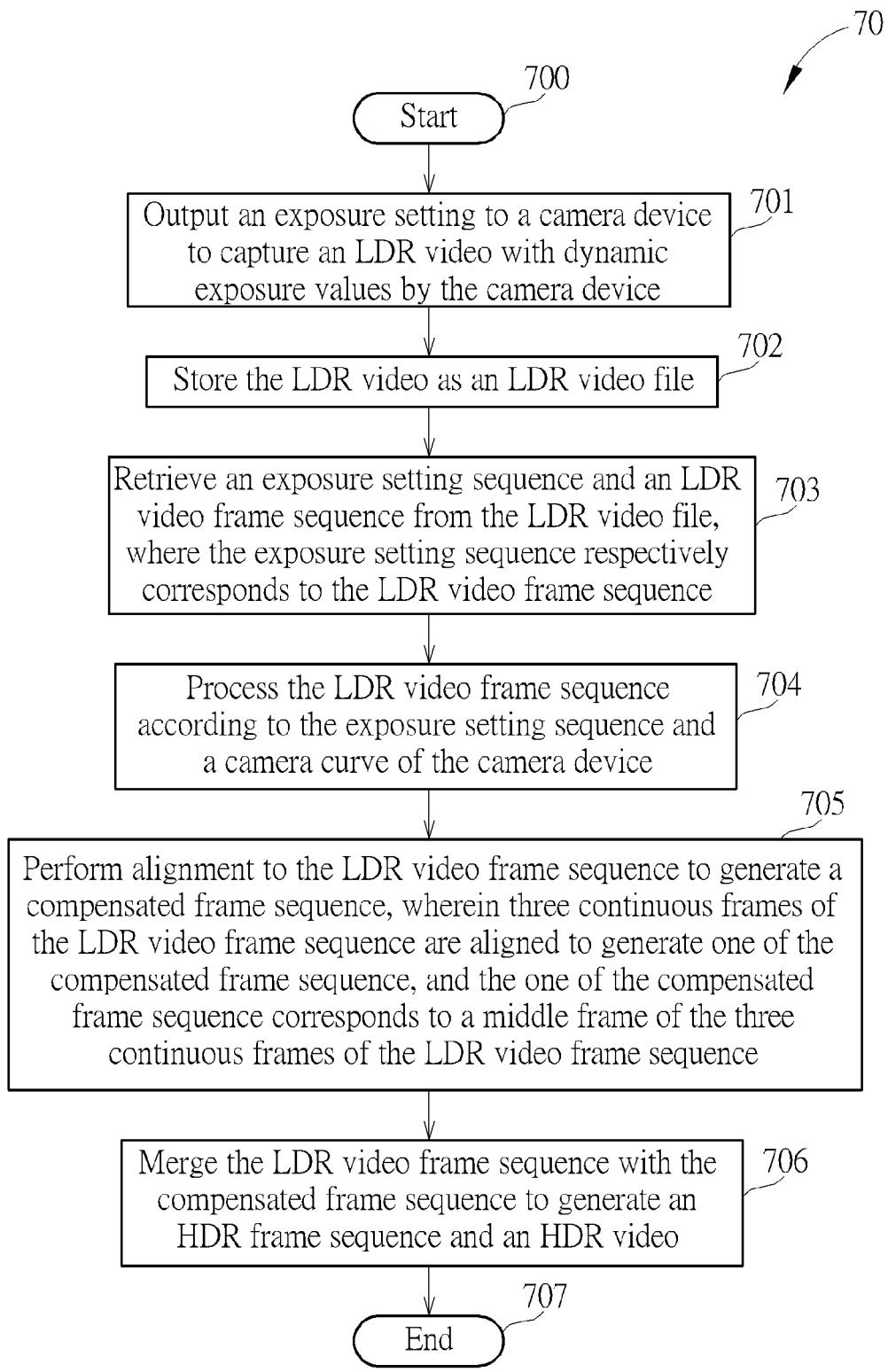
FIG. 7 shows a process of reconstructing HDR video according to an embodiment of the present invention.

Operations of the HDR video reconstruction system 1 can be summarized into a process 70 of reconstructing HDR video as show in FIG. 7. The process 70 of reconstructing HDR video may be compiled into the program code (or a software application), and includes the following steps.

Step 700: Start.

Step 701: Output an exposure setting to a camera device to capture an LDR video with dynamic exposure values by the camera device.

Step 702: Store the LDR video as an LDR video file.

Step 703: Retrieve an exposure setting sequence and an LDR video frame sequence from the LDR video file, where the exposure setting sequence corresponds to the LDR video frame sequence.

Step 704: Process the LDR video frame sequence according to the exposure setting sequence and a camera curve of the camera device.

Step 705: Perform alignment to the LDR video frame sequence to generate a compensated frame sequence, wherein three continuous frames of the LDR video frame sequence are aligned to generate one of the compensated frame sequence, and the one of the compensated frame sequence corresponds to a middle frame of the three continuous frames of the LDR video frame sequence.

Step 706: Merge the LDR video frame sequence with the compensated frame sequence to generate an HDR frame sequence and an HDR video.

Step 707: End.

Detail descriptions of the process of reconstructing HDR video 70 can be obtained by referring to descriptions of FIG. 1A/1B to FIG. 6, which is omitted.

To sum up, the present invention utilizes the regular camera device to capture the LDR video with dynamic exposure values to lower the frame-rate in order to obtain the high dynamic range, and the exposure setting sequence and the corresponding LDR video frame sequence are retrieved from the LDR video file for the frame alignment and frame merging operations. In this manner, the HDR video reconstruction system of the present invention is able to reconstruct the HDR video from the LDR video. The HDR video reconstruction system of the present invention is easy for implementation and compatible with most regular cameras, and only requires a software application based on HDR video reconstruction system, so the cost is much lower than the specialized cameras for directly capturing HDR video.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of reconstructing high dynamic range (HDR) video from low dynamic range (LDR) video, comprising:
    outputting an exposure setting to a camera device to receive an LDR video from the camera device, wherein the camera device captures the LDR video with dynamic exposure values according to the exposure setting;
    storing the LDR video as an LDR video file;
    retrieving an exposure setting sequence and an LDR video frame sequence from the LDR video file, where the exposure setting sequence corresponds to the LDR video frame sequence;
    performing alignment to the LDR video frame sequence to generate a compensated frame sequence; and
    merging the LDR video frame sequence with the compensated frame sequence to generate an HDR frame sequence and the HDR video;
    wherein performing alignment to the LDR video frame sequence to generate the compensated frame sequence comprises:
        performing alignment to first and third frames of three continuous frames of the LDR video frame sequence to generate an aligned frame; and
        performing alignment to a middle frame of the three continuous frames of the LDR video frame sequence and the aligned frame to generate a compensated frame of the compensated frame sequence.

2. The method of claim 1, further comprising:
    processing the LDR video frame sequence according to the exposure setting sequence and a camera curve of the camera device.

3. The method of claim 1, wherein the first and third frames of the three continuous frames are captured with a first exposure value of the dynamic exposure values, and the middle frame of the three continuous frames is captured with a second exposure value of the dynamic exposure values.

4. The method of claim 1, wherein the first, middle and third frames of the three continuous frames are respectively captured with first, second and third exposure values of the dynamic exposure values, and the middle exposure value is lower or higher than both the first and third exposure values.

5. The method of claim 1, further comprising:
    mapping the HDR frame sequence to the LDR video frame sequence according to display configurations of a display device.

6. An apparatus for reconstructing high dynamic range (HDR) video from low dynamic range (LDR) video for an electronic device, comprising:
    a memory device for storing an LDR video with dynamic exposure values as an LDR video file and a program code;
    a processing device coupled to the memory device for performing a process of HDR video reconstruction according to an instruction from the program code to generate an HDR video, wherein the process comprises following steps:
        retrieving an exposure setting sequence and an LDR video frame sequence from the LDR video file, where the exposure setting sequence corresponds to the LDR video frame sequence;
        performing alignment to the LDR video frame sequence to generate a compensated frame sequence; and
        merging the LDR video frame sequence with the compensated frame sequence to generate an HDR frame sequence and the HDR video;
    wherein performing alignment to the LDR video frame sequence to generate the compensated frame sequence comprises:
        performing alignment to first and third frames of three continuous frames of the LDR video frame sequence to generate an aligned frame; and
        performing alignment to a middle frame of the three continuous frames of the LDR video frame sequence and the aligned frame to generate a compensated frame of the compensated frame sequence.

7. The apparatus of claim 6, wherein the electronic device comprises a camera device coupled to the processing device for capturing the LDR video with dynamic exposure values according to an exposure setting.

8. The apparatus of claim 7, wherein the process further comprises:
   outputting the exposure setting to the camera device to receive the LDR video from the camera device.

9. The apparatus of claim 7, wherein the process further comprises:
   processing the LDR video frame sequence according to the exposure setting sequence and a camera curve of the camera device.

10. The apparatus of claim 6, wherein first and third frames of the three continuous frames are captured with a first exposure value of the dynamic exposure values, and the middle frame of the three continuous frames is captured with a second exposure value of the dynamic exposure values.

11. The apparatus of claim 6, wherein first, middle and third frames of the three continuous frames are respectively captured with first, second and third exposure values of the dynamic exposure values, and the middle exposure value is lower or higher than both the first and third exposure values.

12. The apparatus of claim 6, wherein the process further comprises:
   mapping the HDR frame sequence to the LDR video frame sequence according to display configurations of a display device of the apparatus.

* * * * *